(12) United States Patent
Yamauchi et al.

(10) Patent No.: US 8,440,348 B2
(45) Date of Patent: *May 14, 2013

(54) SEALED BATTERY

(75) Inventors: Yasuhiro Yamauchi, Moriguchi (JP);
Kenji Nansaka, Moriguchi (JP);
Toshiyuki Nohma, Moriguchi (JP)

(73) Assignee: SANYO Electric Co., Ltd.,
Moriguchi-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/536,259

(22) Filed: Jun. 28, 2012

(65) Prior Publication Data

US 2012/0270098 A1 Oct. 25, 2012

Related U.S. Application Data

(63) Continuation of application No. 12/237,927, filed on Sep. 25, 2008, now Pat. No. 8,232,002.

(30) Foreign Application Priority Data

Sep. 28, 2007 (JP) .................................. 2007-255243

(51) Int. Cl.
*H01M 2/08* (2006.01)
*H01M 2/02* (2006.01)

(52) U.S. Cl.
USPC .......................... 429/185; 429/181; 429/178

(58) Field of Classification Search .................. 429/185, 429/181, 178
See application file for complete search history.

(56) References Cited

FOREIGN PATENT DOCUMENTS

| JP | 59-232686 A | 12/1984 |
|---|---|---|
| JP | 06-231740 A | 8/1994 |
| JP | 2000-106156 A | 4/2000 |
| JP | 2003-272604 A | 9/2003 |
| JP | 2004-014173 A | 1/2004 |

*Primary Examiner* — Helen O Conley
(74) *Attorney, Agent, or Firm* — Westerman, Hattori, Daniels & Adrian, LLP

(57) ABSTRACT

The external terminal 19 has sword-guard portion $19_1$ provided with a terminal portion $19_3$ formed at one end thereof and a cylindrical crimping member $19_2$ formed at another end thereof, the cylindrical crimping member $19_2$ being inserted through openings each formed at a first insulating member $21_1$, the opening-sealing plate 13, a second insulating member $21_2$ and the collector $18_1$, and being crimped in a diameter-enlarging direction, so that the sword-guard portion $19_1$ of the external terminal 19, the opening-sealing plate 13 and the collector $18_1$ are mechanically-fixed and a thin-walled portion made thinner than other portions formed in a tip portion of the cylindrical crimping member $19_2$ is adhered to the collector, and the thin-walled portion $19_4$ and the collector being welded with a high energy beam.

19 Claims, 9 Drawing Sheets

SEALED BATTERY

RELATED APPLICATIONS

This application is a continuation application of U.S. Ser. No. 12/237,927, filed Sep. 25, 2008, and is based upon and claims the benefit of priority from the prior Japanese Patent Application No. 2007-255243, filed on Sep. 28, 2007, the entire contents of which are incorporated by reference in their entirety.

TECHNICAL FIELD

The present invention relates to a sealed battery and a manufacturing method thereof. More particularly it relates to a sealed battery which can be easily welded, using a high energy beam such as a laser, between a collector attached to a substrate of an electrode assembly and an external terminal; and a manufacturing method thereof.

BACKGROUND ART

Curbs on emissions of carbon dioxide and other substances have been strengthened against a background of a growing environmental protection movement, and in the automobile world there is now vigorous development of electric vehicles (EVs) and hybrid electric vehicles (HEVs) alongside vehicles using fossil fuels such as gasoline, diesel oil and natural gas. In addition, the soaring prices of fossil fuels in recent years have acted to spur on the development of EVs, HEVs and the like.

The batteries used for such EVs, HEVs and the like are generally nickel-hydrogen secondary batteries or lithium ion secondary batteries. But what is now being required of such vehicles is not only environmental friendliness, but also basic performance as an automobile—in other words, superior driving capabilities. Therefore it is necessary not simply to enlarge the battery capacity, but also to increase the battery output, which exerts large effects on an automobile's acceleration and hill-climbing performance. However, when a high output is discharged, a large current flows in the battery, and as a result there is an increase in heat-up due to contact resistance between the collectors and the external terminal for the external connection, which are the generation elements. Thus, batteries for EVs and HEVs are required not only to be large-sized and large capacity, but also to handle a large current. Accordingly, many improvements have been carried out with regard to lowering the internal resistance by preventing electric-connection faults between the collectors and external terminal, which are the generation elements.

As a method for electrically joining the collectors and the external terminal, which are the generation elements, mechanical crimping has been frequently used conventionally. However, since only by a simple mechanical crimping, the electrical resistance changes over time under an environment with frequent vibrations, such as with EVs and HEVs, mechanical crimping is used in combination with laser welding. Here, an example for combining mechanical crimping and laser welding as a conventional method for electrically joining the collectors and the external terminal, which are the generation elements, is described referring to FIGS. 6 to 9.

Figure 6:
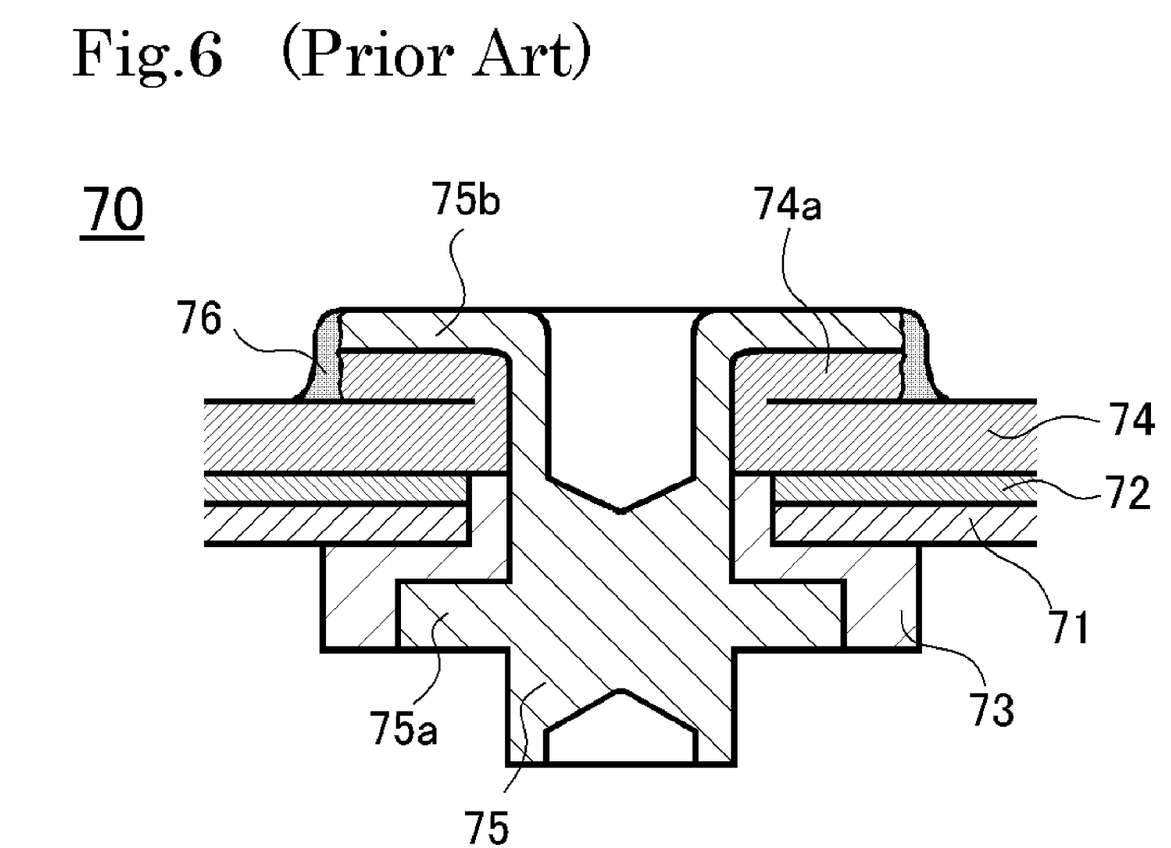
FIG. 6 is a cross-sectional view showing the joint of collectors and an external terminal, which are the generation elements in one conventional example, turned upside down.
Figure 7:
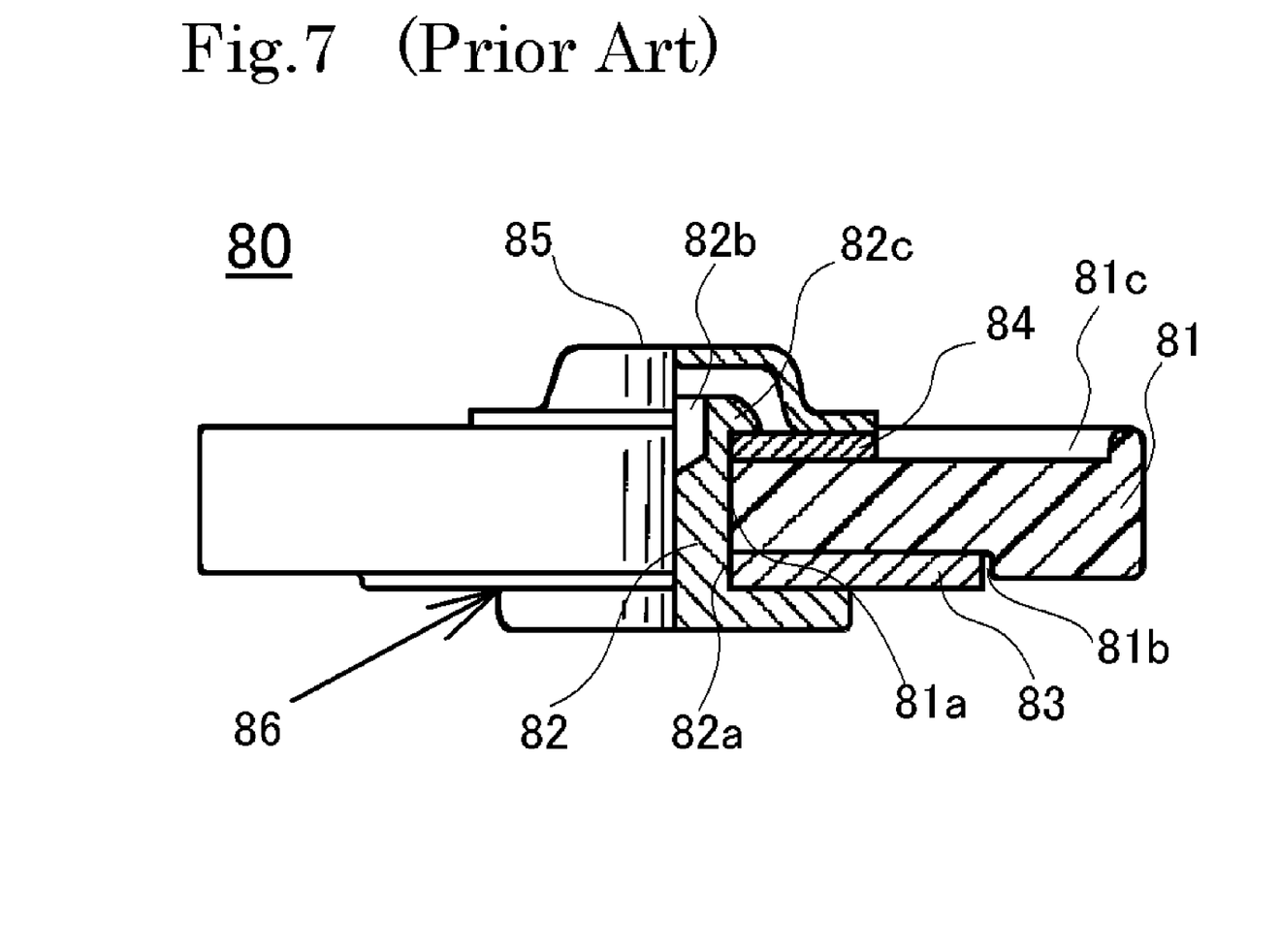
FIG. 7 is a partial cross-sectional view showing the joint of collectors and an external terminal, which are the generation elements in another conventional example.
Figure 8:
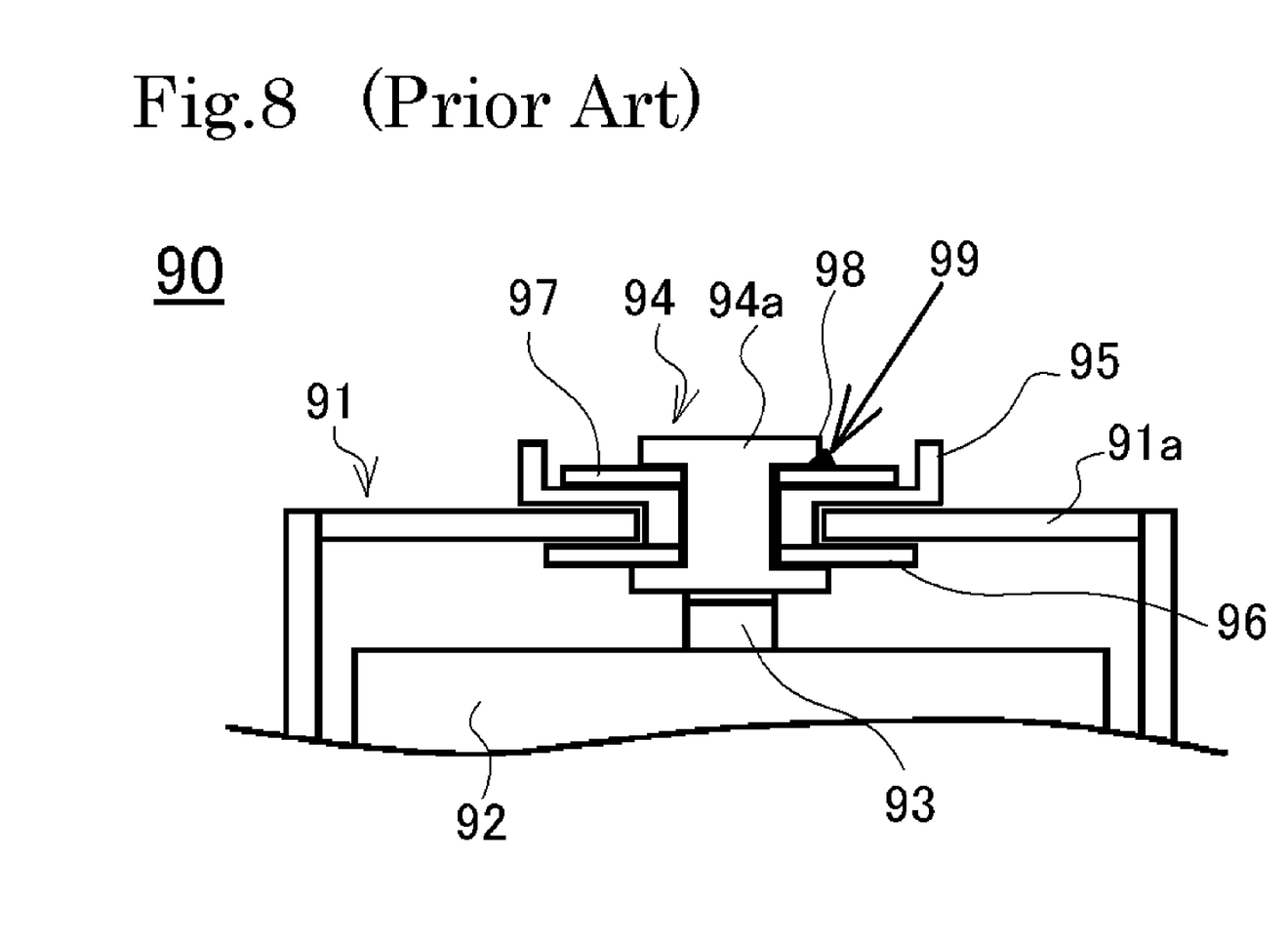
FIG. 8 is an enlarged cross-sectional view showing the joint of collectors and an external terminal, which are the generation elements in yet another conventional example.
Figure 9:
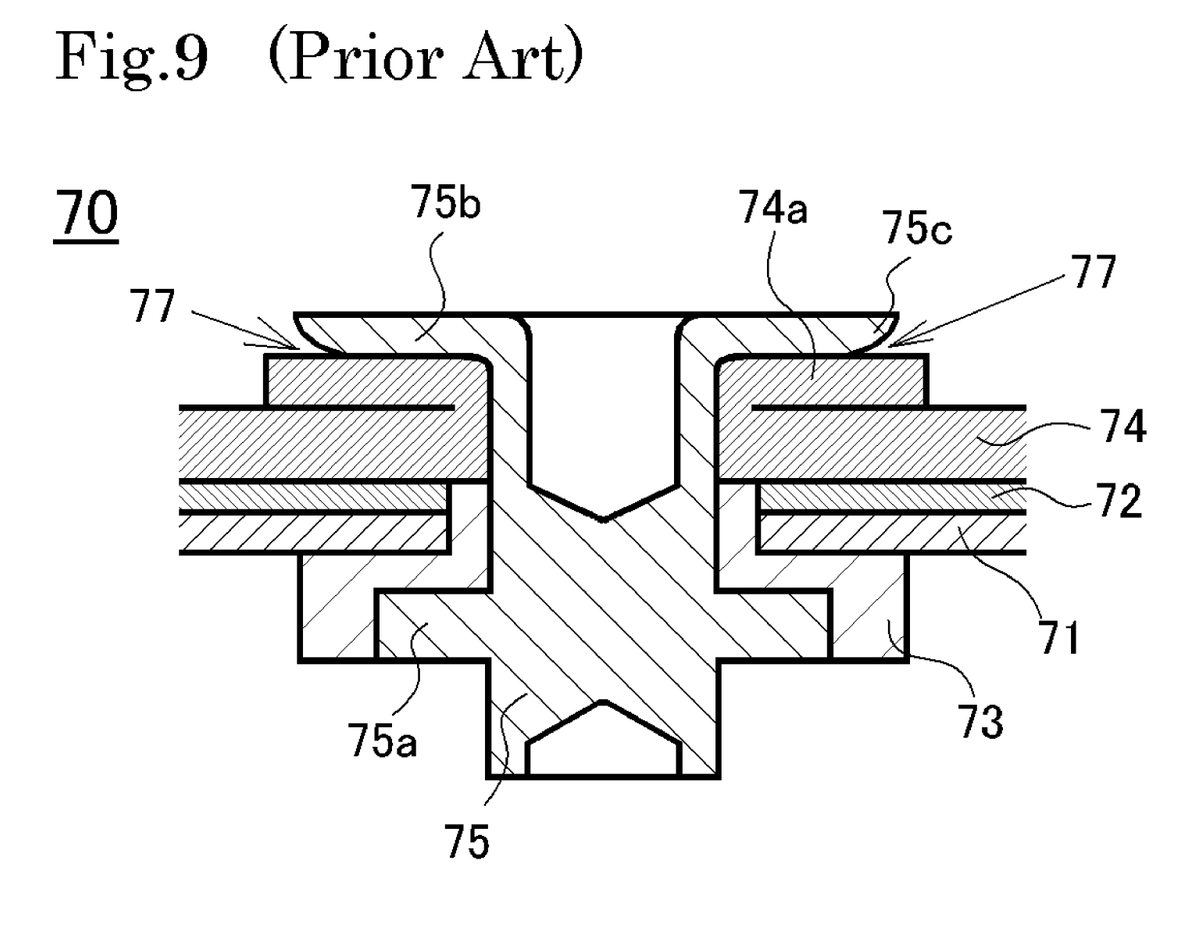
FIG. 9 is a cross-sectional view showing the joint of collectors and an external terminal, which are the generation elements shown in FIG. 6 before the welding.

FIG. 6 is a cross sectional view showing a joint of collectors and an external terminal, which are the generation elements disclosed in JP-A-2004-14173, turned upside down. FIG. 7 is a partial cross sectional view showing a joint of collectors and an external terminal, which are the generation elements disclosed in JP-A-Heisei 6-231740. FIG. 8 is an enlarged cross sectional view showing a joint of collectors and an external terminal, which are the generation elements disclosed in JP-A-2003-272604. In addition, FIG. 9 is a cross sectional view showing a joint of collectors and an external terminal, which are the generation elements in FIG. 6 before the welding.

A joint 70 of collectors and an external terminal, which are the generation elements disclosed in JP-A-2004-14173 includes: as shown in FIG. 6, a cover plate 71 fixed to a battery outer body (not shown in the drawings); an inside insulating-sealing material 72 and an outer insulating-sealing material 73; a collector 74 connected to the generation elements; and a rivet terminal 75. The inside insulating-sealing material 72 and the outer insulating-sealing material 73 have a through-bore and are arranged in both inner and outer circumferential parts of an opening formed in the cover plate 71. The collector 74 has a terminal opening and a projected body 74a sagging along the terminal opening, and is arranged superimposed on the inside insulating-sealing material 72. The rivet terminal 75 has a rivet part 75b projection-contacted from a jaw part 75a.

Then, the joined part 70 is produced by a method including: assembling the rivet part 75b of the rivet terminal 75 so that from the outer circumference side of the cover plate 71, the rivet part 75b penetrates the through-bore of the inside insulating-sealing material 72 and the outer insulating-sealing material 73, the opening of the cover plate 71 and the rivet terminal opening of the collector 74; crimping the rivet part 75b of the rivet 75 by pushing the projected body 74a of the collector 74 thereto; and laser-welding the rivet part 75b and the collector 74 to form a welded portion 76.

In addition, a joint 80 of collectors and an external terminal, which are the generation elements disclosed in JP-A-Heisei 6-231740 includes: as shown in FIG. 7, a resin-made opening-sealing plate 81; a rivet 82; a metal-made washer 83; a washer 84 for attaching a cap; and a terminal cap 85. The rivet 82 includes: a head portion 82a of the rivet having a large diameter; and a foot portion 82c of the rivet having a diameter smaller than that of the head portion 82a and extending perpendicularly from the head portion 82a of the rivet in which an opening portion 82b is formed in a tip portion thereof. In addition, in the resin-made opening-sealing plate 81, a through-bore 81a is formed in the central part thereof, as well as concave portions 81b and 81c for placing respectively the metal-made washer 83 and the washer 84 for attaching a cap thereon are formed respectively around the through-bore 81a on the surface and around the through-bore 81a on the reverse surface.

Then, the joint 80 is produced as follows. First, the foot portion 82c of the rivet 82 is caused to penetrate the through-bore 81a of the metal-made washer 83 and the resin-made opening-sealing plate 81, and further the washer 84 for attaching a cap. Next, the opening portion 82b formed in the tip portion of the foot portion 82c of the rivet 82 is crimped toward the side of the washer 84 for attaching a cap, and then the terminal cap 85 is attached. Thereafter, an appropriate portion of the position 86 between the head portion 82a of the rivet 82 and the metal-made washer 83 is laser-welded to produce the joint 80.

In addition, in a joint 90 of collectors and an external terminal, which are the generation elements disclosed in JP-A-2003-272604, as shown in FIG. 8, to a battery header 91 provided in an upper opening of the battery outer can, a collector 93 connected to a generation element 92 is joined via an aluminum-made electrode delivering pin 94a of an electrode terminal 94. The electrode delivering pin 94a is insulated from a metal plate 91a of the battery header 91 by an outer insulating plate 95 and an inner insulating plate 96 which are fitted in a through-bore provided in a metal plate 91a of the battery header 91. In addition, on the upper surface of the outer insulating plate 95, a nickel-made electrode drawing plate 97 for joining a lead wire for external connection thereto is provided.

Then, by irradiating a laser to a contacted portion of the outer circumference portion 98 formed by crimping the surface of the electrode drawing plate 97 and the electrode delivering pin 94a and the electrode drawing plate 97, the joint 90 composed of nickel and aluminum is formed. Since the joint 90 disclosed in JP-A-2003-272604 is formed by laser-welding a contacted portion of a metal and another different metal having a melting point different largely from that of the former metal in an electrode terminal formed by crimping, the impairment of conductivity connection properties of a contacted surface due to the change with time can be prevented.

As described above, since the continuity of the joint of the collector and the external terminal, which are the generation elements, is produced by crimping the external terminal, that is, only by pressure-welding, the resistance cannot be expected to be thoroughly lowered, so that by laser-welding a crimped portion of the external terminal and the collector which is a generation element, the contact resistance is reduced. However, for example, in a crimping method of a conventional example shown in FIG. 6, as shown in FIG. 9, since the more the tip 75c of the crimped portion after the rivet portion of 75b of the rivet terminal 75 has been crimped, the smaller the material thickness of the rivet portion 75b which becomes spread, a gap 77 is caused between the projected body 74a of the collector 74 and the tip 75c of the crimped portion. Therefore, the welding of the projected body 74a of the collector 74 and the tip 75c of the crimped portion is performed by irradiating a laser beam in a diagonal direction of about 45° with aiming at the gap, by reflecting the laser beam redundantly in the gap and by molten-joining the crimped portion tip 75c and the projected body 74a of the collector 74 to obtain a laser welded portion 76 shown in FIG. 6.

In the laser welding, an assistance gas is used. However, this assistance gas does not circulate thoroughly around the welded portion 76 in the gap, so that spattered metal fine particles during the laser welding are oxidized and soot-shaped metal oxide fine particles are attached to the member to be welded. Moreover, during the production of a battery on an industrial scale, the laser welding of a terminal portion is performed on an assembly line, so that a deviation between the welded portion of the battery and a laser irradiated position is caused sometimes. In this case, when the laser irradiated position is deviated to the side of the projected body 74a of the collector 74, the amount of the laser beam irradiated to the side of the crimped portion tip 75c of the rivet terminal 75 becomes small, so that a melting deficit is caused. On the contrary, when the laser irradiated position is deviated to the side of the crimped portion tip 75c of the rivet terminal 75, the surface of the side of the tip 75c of the crimped portion is spattered, so that the laser welding is not performed normally. Such a phenomenon is caused not only in a conventional example shown in FIG. 6, but also in conventional examples shown in FIGS. 7 and 8 alike.

In addition, since in the above-described conventional examples, the laser irradiation is performed in a direction diagonal relative to the member to be welded, in order to weld multiple positions symmetrically, the member to be welded is necessary to be rotated, there is a problem that the production apparatus becomes complex.

SUMMARY

The advantage of some aspects of the invention is to provide a sealed battery in which in a structure in which the collector and the external terminal which are the generation elements of the sealed battery are electrically-connected and fixed by crimping a crimped portion of the external terminal, by molding-processing the crimped portion tip, a high energy beam such as a laser beam can be irradiated from the upper side in a nearly perpendicular direction relative to the portion to be welded and by this treatment, the portion to be welded can be thoroughly coated with an assistance gas, so that the portion to be welded is prevented from being oxidized, as well as the welding of the external terminal and the collector with a high energy beam can be performed easily and accurately; and a manufacturing method thereof.

According to an aspect of the invention, a sealed battery is one in which an external terminal is attached to an opening-sealing plate; the opening-sealing plate is fixed in an opening portion of a battery outer can having an electrode assembly in the inside thereof in an encapsulated state; and the external terminal and a collector of the electrode assembly are electrically-connected to each other, a terminal portion of the external terminal being formed at one terminal of a sword-guard portion and a cylindrical crimping member to be crimped being formed at another terminal of the sword-guard portion; the cylindrical crimping member to be crimped being inserted in the openings formed in a first insulating member, an opening-sealing plate, a second insulating member and the collector and being conducted with a first insulating member, an opening-sealing plate, a second insulating member and the collector; the cylindrical crimping member to be crimped being crimped in a diameter-enlarging direction, so that the sword-guard portion of the external terminal, the opening-sealing plate and the collector are mechanically-fixed and a thin-walled portion made thinner than other portions formed in a tip portion of the cylindrical crimping member to be crimped is adhered to the collector; and the thin-walled portion made thinner than other portions and the collector being welded with a high energy beam.

In the sealed battery of the invention, a cylindrical crimping member to be crimped is inserted in the openings formed in a first insulating member, an opening-sealing plate, a second insulating member and the collector and is conducted with a first insulating member, an opening-sealing plate, a second insulating member and the collector; the cylindrical crimping member is crimped in a diameter-enlarging direction, so that the sword-guard portion of the external terminal, the opening-sealing plate and the collector are mechanically-fixed; and a thin-walled portion made thinner than other portions formed in a tip portion of the cylindrical crimping member to be crimped is adhered to the collector. Therefore, there is caused no gap between the tip portion of the cylindrical crimping member to be crimped and the collector. Moreover, the tip portion of the cylindrical crimping member to be crimped is made thinner, so that when the thin-walled portion made thinner and the collector are welded with a high energy beam, a melting deficit or spatter is not caused, so that a sealed battery having advantageous reliability of the welded portion is produced. Here, the sealed battery of the invention may be non-aqueous electrolyte secondary battery or an aqueous electrolyte secondary battery.

In addition, in the sealed battery of the invention, it is preferred that the above first insulator is that composed of a gasket.

When as the first insulator, that composed of a gasket is used, the sealing degree between the external terminal and the opening-sealing plate becomes advantageous, the leakage of an electrolyte or a gas from between the external terminal and the opening-sealing plate is unlikely to be caused, so that a sealed battery having high safety can be obtained.

According to an aspect of the invention, a manufacturing method of a sealed battery is one in which an external terminal is attached to an opening-sealing plate; the opening-sealing plate is fixed in an opening portion of a battery outer can having an electrode assembly in the inside thereof in an encapsulated state; and the external terminal and a collector of the electrode assembly are electrically-connected to each other, including: using the external terminal in which a terminal portion of the external terminal is formed at one terminal of a sword-guard portion and a cylindrical crimping member to be crimped is formed at another terminal of the sword-guard portion; inserting a cylindrical crimping member to be crimped in the openings formed in a first insulating member, an opening-sealing plate, a second insulating member and the collector and conducting a cylindrical crimping member to be crimped with a first insulating member, an opening-sealing plate, a second insulating member and the collector; placing the sword-guard portion of the external terminal on a jig, crimping the cylindrical crimping member to be crimped in a diameter-enlarging direction, and molding the tip portion of the cylindrical crimping member to have a smaller thickness than those of other portions, adhering the tip portion to the surface of the collector; irradiating a high energy beam to the surface of the portion of the tip portion of the member to be crimped which has been molded to have a smaller thickness than those of other portions to weld the portion of the tip portion of the member to be crimped which has been molded to have a smaller thickness than those of other portions, and the collector.

In the manufacturing method of the sealed battery of the invention, an external terminal in which a terminal portion of the external terminal is formed at one terminal of a sword-guard portion and a cylindrical crimping member to be crimped is formed at another terminal of the sword-guard portion, is used; the cylindrical crimping member to be crimped of the external terminal is inserted in the openings formed in a first insulating member, an opening-sealing plate, a second insulating member and the collector and is conducted with a first insulating member, an opening-sealing plate, a second insulating member and the collector; the sword-guard portion of the external terminal is placed on a jig and the cylindrical crimping member to be crimped is crimped in a diameter-enlarging direction; the tip portion of the member to be crimped is molded to have a smaller thickness than those of other portions and the tip portion is adhered to the surface of the collector.

Through such processes, it can be prevented that a gap is caused between the collector and the tip portion of the member to be crimped which has been molded to have a smaller thickness. Moreover, since the tip portion of the member to be crimped has been molded to have a smaller thickness, by irradiating a high energy beam to the surface of the tip portion of the member to be crimped which has been molded to have a smaller thickness, the beam penetrates easily through a molten portion and a part of the collector can be molten, so that the collector and the tip portion of the member to be crimped can be tightly welded.

Moreover, according to the manufacturing method of the invention, since the portion molded to have a smaller thickness of the tip portion of the member to be crimped is formed parallel to the surface of the collector, the irradiation of a high energy beam can be performed from the upper side of the tip portion of the member to be crimped which has been molded to have a smaller thickness. Therefore, an assistance gas used during the laser welding can coat thoroughly the portion to be welded, so that the oxidation of the portion to be welded can be suppressed and soot-shaped metal oxide fine particles observed in a conventional example are not generated. In addition, since an allowance for the position deviation of the welding becomes larger, the welding can be easily performed.

In the manufacturing method of the sealed battery of the invention, the portion molded to have a smaller thickness of the tip portion of the member to be crimped is preferably formed in a circle ring shape or symmetrically relative to the central axis of the cylindrical crimping member to be crimped.

By a manufacturing method of the sealed battery according to such an aspect, only by moving the portion molded to have a smaller thickness of the tip portion of the member to be crimped in one direction, multiple positions in symmetry site can be easily welded.

In the manufacturing method of the sealed battery of the invention, a laser beam or an electron beam is preferably used as a high energy beam.

By a manufacturing method of the sealed battery according to such an aspect, since both of the laser beam and the electron beam are conventionally used as a high energy beam for the welding, a sealed battery in which the reliability of the welded portion and the quality of the battery are advantageous can be obtained.

In the manufacturing method of the sealed battery of the invention, it is preferred that the high energy beam is irradiated in a direction inclining by 60° to 90° as an incident angle from the surface of the portion molded to have a smaller thickness of the tip portion of the member to be crimped.

In the invention, the high energy beam is irradiated in a direction inclining by 60° to 90° as an incident angle from the surface of the portion molded to have a smaller thickness of the tip portion of the member to be crimped. Even when the incident angle of the high energy beam during the welding is deviated a little from 90° relative to the surface to be welded, that is, so long as it is 60° or more, the energy loss due to the reflection of the high energy beam to the surrounding is reduced and also the generation of the spatter is reduced. Accordingly, it is preferred that the high energy beam is irradiated in a direction inclining by 60° to 90° as an incident angle from the surface of the portion molded to have a smaller thickness of the tip portion of the member to be crimped.

BRIEF DESCRIPTION OF THE DRAWINGS

The invention will be described with reference to the accompanying drawings, wherein like numbers reference like elements.

DESCRIPTION OF EXEMPLARY EMBODIMENTS

An exemplary embodiment of the invention will now be described with reference to the accompanying drawings and to the embodiment. It should be understood however that the embodiment below is intended by way of illustrative example of a manufacturing method of a prismatic nonaqueous electrolyte secondary battery using a laser beam as a high energy beam, as an instance of manufacturing methods, that carries out the technical concepts of the invention, and is not intended by way of limiting the invention to this particular manufacturing method for a prismatic nonaqueous electrolyte secondary battery. The invention could equally well be applied to yield other embodiments within the scope and spirit of the claims.

Figure 1:
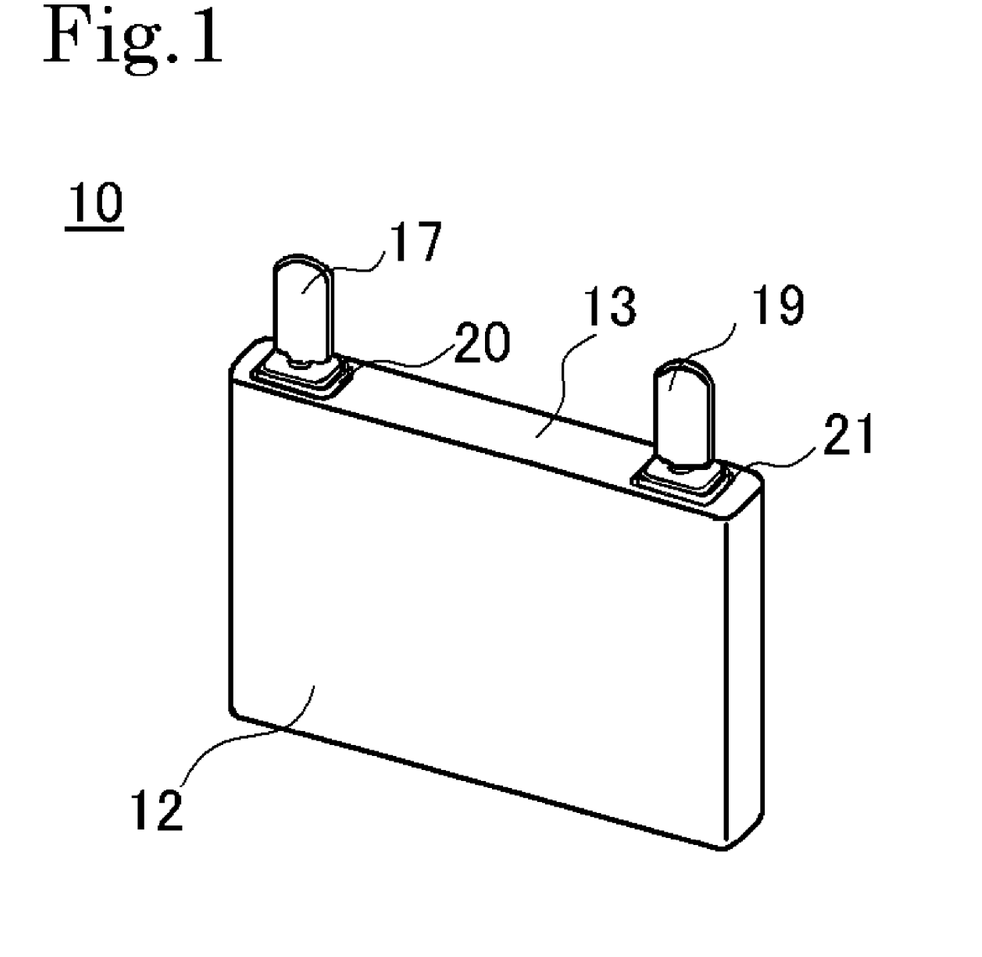
FIG. 1 is a perspective view illustrating a sealed battery according to the embodiment.
Figure 2A:
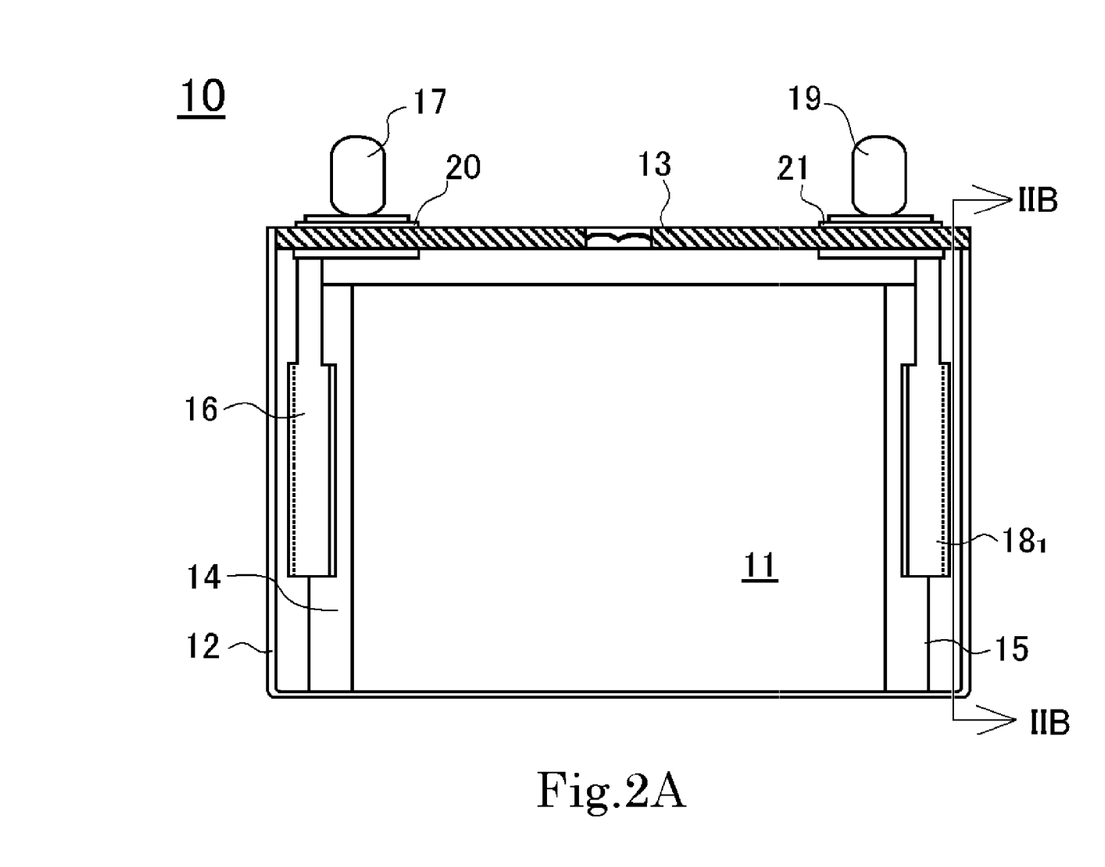
FIG. 2A is a front view illustrating the internal structure of the sealed battery shown in FIG. 1.
Figure 2B:
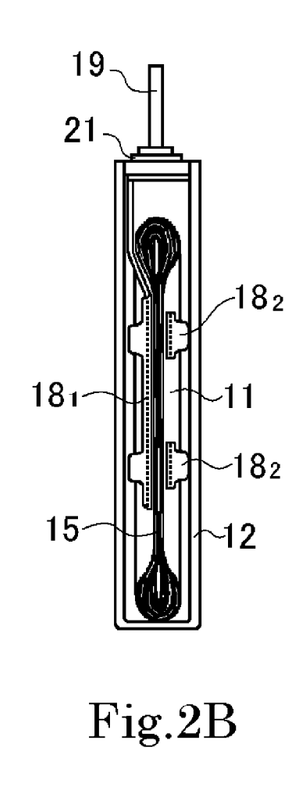
FIG. 2B is a cross sectional view along line IIB-IIB in FIG. 2A.
Figure 3:
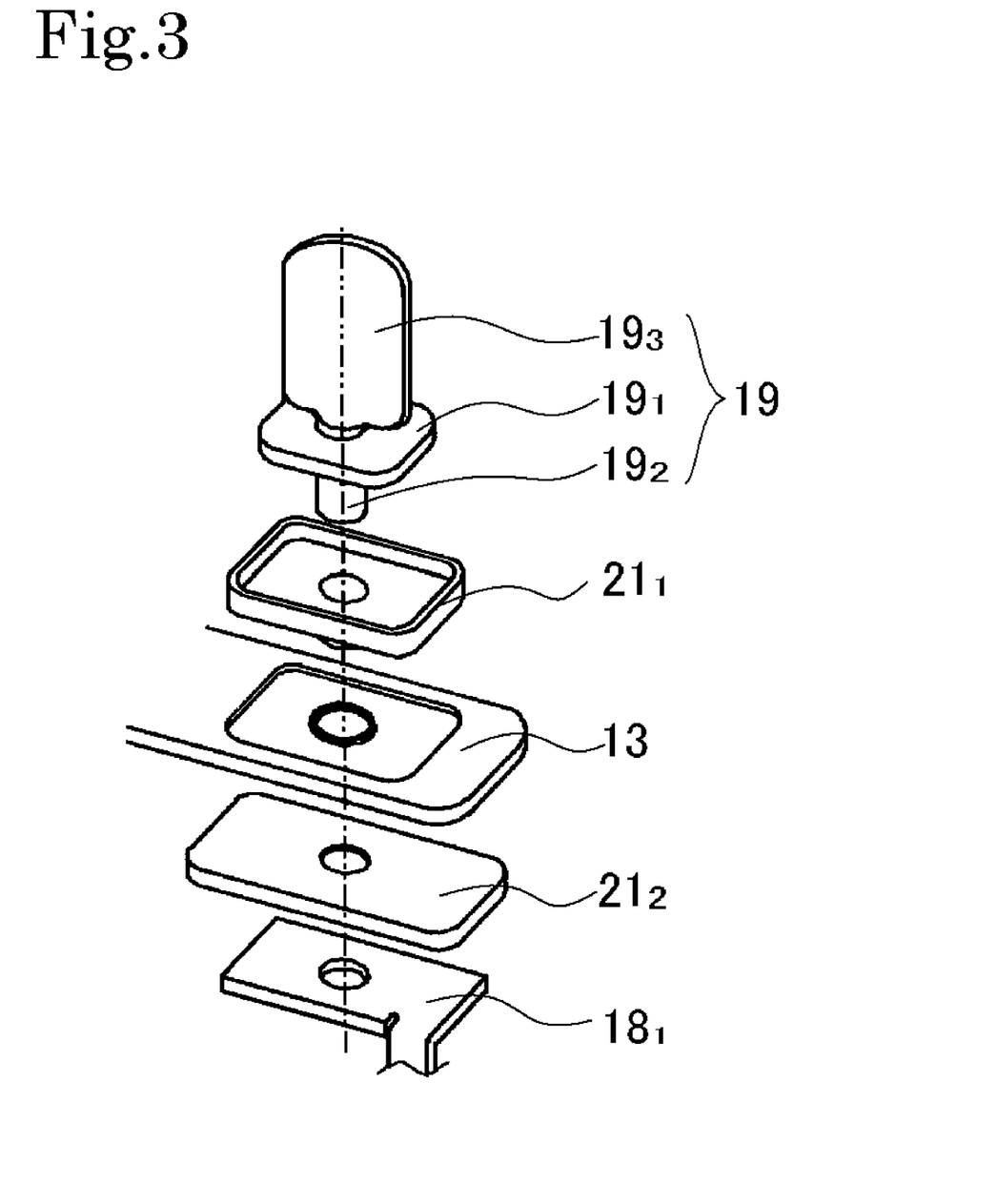
FIG. 3 is a perspective view of the external terminal before the assembly.
Figure 4:
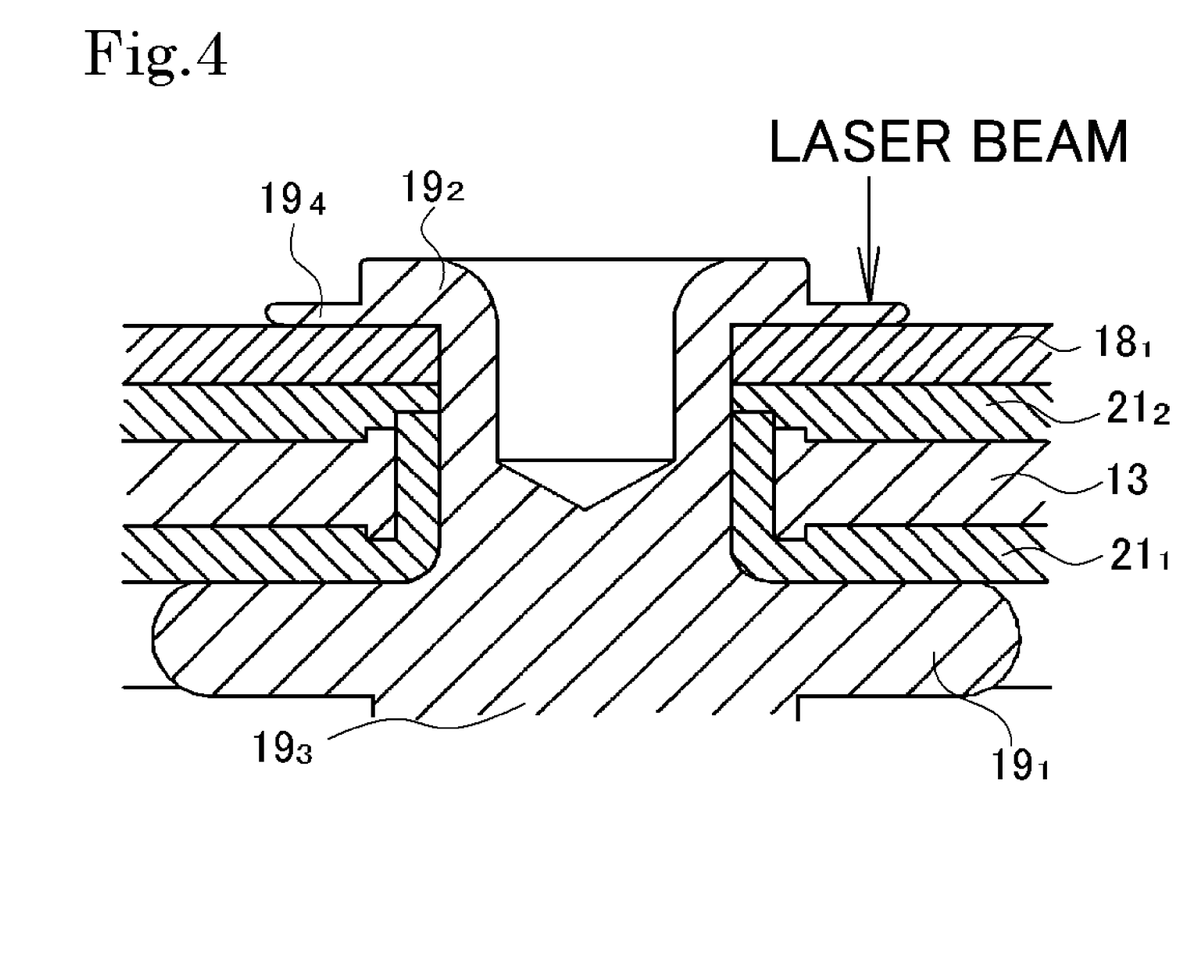
FIG. 4 is a partial cross-sectional view of the external terminal which has been assembled before the welding thereof.
Figure 5:
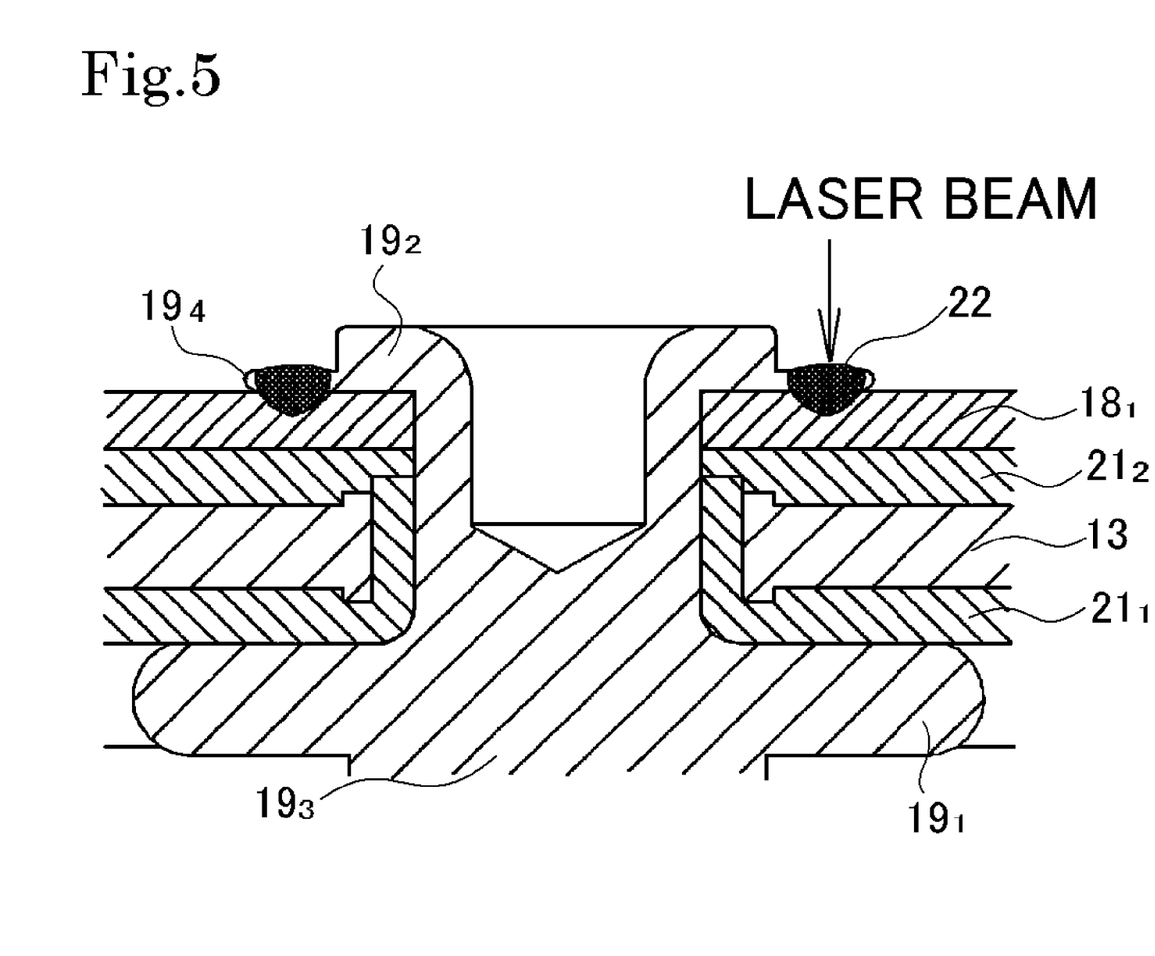
FIG. 5 is a partial cross-sectional view of the external terminal which has been already welded.

FIG. 1 is a perspective view illustrating a sealed battery according to the embodiment. FIG. 2A is a front view illustrating the internal structure of the sealed battery shown in FIG. 1, and FIG. 2B is a cross sectional view along line IIB-IIB in FIG. 2A. FIG. 3 is a perspective view of the external terminal before the assembly. FIG. 4 is a partial cross-sectional view of the external terminal which has been assembled before the welding thereof. FIG. 5 is a partial cross-sectional view of the external terminal which has been already welded.

First of all, a prismatic nonaqueous electrolyte secondary battery that is as an instance of a sealed battery according to the present embodiment will be described using FIGS. 1 to 3. In this prismatic nonaqueous electrolyte secondary battery 10, a flat wound electrode assembly 11, which is made up of positive electrode plates (not shown in the drawings) and negative electrode plates (not shown in the drawings) wound with separators (not shown in the drawings) interposed, is housed inside a rectangular outer can 12, and the outer can 12 is sealed by an opening-sealing plate 13.

The flat wound electrode assembly 11 has, at one end in the winding axis direction, positive electrode substrate exposed portions 14 over which positive electrode binder is not spread, and at the other end, negative electrode substrate exposed portions 15 over which negative electrode binder is not spread. The positive electrode substrate exposed portions 14 are connected to a positive electrode terminal 17 via a positive electrode collector 16 and the negative electrode substrate exposed portions 15 are connected to a negative electrode terminal 19 via a negative electrode collector 18$_1$. The positive electrode terminal 17 and the negative electrode terminal 19 are fixed to the opening-sealing plate 13 via insulating members 20 and 21 respectively.

To fabricate this prismatic nonaqueous electrolyte secondary battery, the flat wound electrode assembly 11 is inserted into the outer can 12, then the opening-sealing plate 13 is laser-welded over the mouth portion of the outer can 12, after which the nonaqueous electrolyte is poured in through an electrolyte pour hole (not shown in the drawings) and the electrolyte pour hole is sealed up.

Here, the specific constitutions of the positive electrode terminal 17 and the negative electrode terminal 19 are described. However, the difference between these two constitutions is only that normally, while the positive electrode collector 16 is composed of a metal aluminum, the negative electrode collector 18$_1$ is composed of a metal copper, and other constitution is substantially the same between the two constitutions, so that the description of the specific constitution is represented by the description of the negative electrode terminal 19.

The negative electrode terminal 19 includes: a cylindrical crimping member to be crimped 19$_2$ formed in one terminal side of a sword-guard portion 19$_1$; and a terminal portion 19$_3$ formed in another terminal side of the sword-guard portion 19$_1$. This cylindrical crimping member to be crimped 19$_2$ is assembled by inserting it in the openings formed in a gasket 21$_1$ as the first insulator, an opening-sealing plate 13, an insulating plate 21$_2$ as the second insulator and a negative electrode collector 18$_1$ and by conducting it with a gasket 21$_1$ as the first insulator, an opening-sealing plate 13, an insulating plate 21$_2$ as the second insulator and a negative electrode collector 18$_1$. The assembled negative electrode terminal 19 is placed on a jig (not shown in drawings) in the assembled state with turning the terminal portion 19$_3$ to the lower. The assembled negative electrode terminal 19 is crimped from the tip side of the member to be crimped 19$_2$ as the diameter is enlarged equally in all directions, and is molded so that a thin-walled portion 19$_4$ having a thickness smaller than those of other portions of the member to be crimped 19$_2$ is formed in a ring shape in the tip side of the member to be crimped 19$_2$. Thus, the thin-walled portion 19$_4$ in the tip portion of the member to be crimped 19$_2$ is thoroughly adhered to the negative electrode collector 18$_1$, and the surface thereof is made to be flat.

When a laser beam is irradiated to the surface of the thin-walled portion 19$_4$, since the thin-walled portion 19$_4$ has a small thickness, as shown in FIG. 5, a molten portion 22 is formed not only in the thin-walled portion 19$_4$, but also in a part of the negative electrode collector 18$_1$. In this state, when the irradiation of a laser is stopped, the negative electrode collector 18$_1$ and the thin-walled portion 19$_4$ in the tip portion of the member to be crimped 19$_2$ can be tightly welded.

Differing from the case of the above-described conventional example, this irradiation of a laser beam can be performed from the above to the surface of the thin-walled portion 19$_4$ with an angle near to 90°, for example with an angle of 60° to 90°. In the case of irradiating a laser beam, the nearer to 90° the angle formed by the light irradiating direction and the surface to be irradiated is, the more the energy loss due to the reflection of the laser to the surrounding is reduced and the more the generation of the spatter is reduced. Therefore, according to the above embodiment, the generation of the soot as in a conventional example becomes reduced and a melting deficit is prevented, so that an advantageous welded portion can be obtained. Moreover, in the above embodiment, since the position to which the laser beam is irradiated may be any position on the surface of the thin-walled portion 19$_4$, by together with enlarging the area occupied by the thin-walled portion 19$_4$, an allowance for the position deviation of the welding becomes larger, so that the welding can be easily performed. In addition, as shown in FIG. 5, also in the case of forming welded positions symmetrically, the welded positions can be easily formed without rotating the assembled parts particularly, only by moving the assembled parts in one direction.

In addition, in the above embodiment, it is described that the thin-walled portion 19$_4$ of the member to be crimped 19$_2$ is formed in a ring shape. However, it is not necessary to be formed always in a ring shape and the thin-walled portion $19_4$ may be formed at multiple positions which are symmetric relative to the central axis of the cylindrical crimping member to be crimped $19_2$. In the above embodiment, the case of the laser welding is described, however, in the case of an electron beam welding, the welding can be performed also in substantially the same manner.

The collector $18_1$ of the thus produced external terminal 19 is, for example resistance-welded to the negative electrode substrate exposed portion 15 of the flat wound electrode assembly 11. Then, the collector 16 of the positive electrode terminal 17 produced in substantially the same manner is resistance-welded to the positive electrode substrate exposed portion 14. Thereafter, the flat wound electrode assembly 11 is inserted into the outer can 12 of the battery, then the opening-sealing plate 13 is laser-welded over the mouth portion of the outer can 12 of the battery, after which the nonaqueous electrolyte is poured in through an electrolyte pour hole (not shown in the drawings) and the electrolyte pour hole is sealed up, to obtain a nonaqueous electrolyte secondary battery as the sealed battery of the embodiment.

Although the above embodiment is described as using a rectangular outer can, there is no particular restriction on the outer can shape, and a cylindrical outer can could alternatively be used. However, in the interest of efficient use of space in the equipment to which the battery is installed, a rectangular shaped outer can will preferably be used. Also, although the above embodiment is described as using a flat wound electrode assembly, it would obviously be possible to use instead an electrode assembly of stacked plate-form positive and negative electrodes with separators interposed, or the like. Further, though in the above embodiment, the case of the nonaqueous electrolyte secondary battery is described, the invention can be also applied to an aqueous electrolyte secondary battery in substantially the same manner.

What is claimed is:

1. A sealed battery, comprising:
   an outer body having an opening portion,
   an opening-sealing plate sealing the opening portion of the outer body,
   an electrode assembly housed in the outer body, and
   an external terminal electrically connected to the electrode assembly;
   wherein a first insulator is arranged on one face of the opening-sealing plate, a second insulator is arranged on another face of the opening-sealing plate, a conductive member is arranged on a face of the first insulator being opposite to a side where the opening-sealing plate is positioned, each one of the opening-sealing plate, the first insulator, the second insulator and the conductive member has a through hole and the external terminal has a sword-guard portion;
   and wherein a connecting member passing through each of the through holes of the second insulator, the opening-sealing plate, the first insulator and the conductive member is provided on one side of the sword-guard portion, a tip portion of the connecting member is crimped so that the opening-sealing plate and the conductive member are mechanically fixed and a thin-walled portion made thinner than other portions formed in a tip portion of the crimped portion is adhered to the conductive member; and the thin-walled portion and the conductive member are welded with a high energy beam.

2. The sealed battery according to claim 1, wherein the electrode assembly is a flat wound electrode assembly being made up of positive electrode and negative electrode wound with separators and is inserted into the outer body so that the winding axis direction of the electrode assembly is parallel to the opening-sealing plate.

3. The sealed battery according to claim 2, wherein a positive electrode substrate exposed portion is provided at one end portion of the electrode assembly, a negative electrode substrate exposed portion is provided at the other end portion of the electrode assembly, a positive conductive member is connected to the positive electrode substrate exposed portion, and a negative conductive member is connected to the negative electrode substrate exposed portion.

4. The sealed battery according to claim 1, wherein the thin-walled portion is formed at plural portions.

5. The seated battery according to claim 1, wherein a hollow portion exists at the center of the tin portion of the connecting member.

6. The sealed battery according to claim 1, wherein the thickness of the sword-guard portion is thicker than that of the opening-sealing plate.

7. The sealed battery according to claim 1, wherein a cylindrical crimping member is used for the connecting member and is crimped.

8. The sealed battery according to claim 1, wherein a laser beam or an electron beam is employed as the high energy beam.

9. The sealed battery according to claim 1, wherein the electrode assembly is formed in a flat shape.

10. A sealed battery, comprising:
    an outer body having an opening portion,
    an opening-sealing plate sealing the opening portion of the outer body,
    an electrode assembly housed in the outer body, and
    an external terminal electrically connected to the electrode assembly;
    wherein a first insulator is arranged on one face of the opening-sealing plate, a second insulator is arranged on another face of the opening-sealing plate, a conductive member is arranged on a face of the first insulator being opposite to a side where the opening-sealing plate is positioned, each one of the opening-sealing plate, the first insulator, the second insulator and the conductive member has a through hole and the external terminal has a flange portion;
    and wherein a connecting member passing through each of the through holes of the second insulator, the opening-sealing plate, the first insulator and the conductive member is provided on one side of the flange portion, a tip portion of the connecting member is crimped so that the opening-sealing plate and the conductive member are mechanically fixed and a tip portion of the crimped portion is adhered and welded to the conductive member with a high energy beam in such a way that a plurality of welded portions are formed, and the welded portions, formed by an irradiation of the high energy beam and welded to the conductive member, of the crimped portion are thinner than the other area of the crimped portion.

11. The sealed battery according to claim 10, wherein the electrode assembly is a flat wound electrode assembly being made up of positive electrode and negative electrode wound with separators and is inserted into the outer body so that the winding axis direction of the electrode assembly is parallel to the opening-sealing plate;
    the electrode assembly is provided with a positive electrode substrate exposed portion at one end portion thereof and the negative electrode substrate portion at the other end portion thereof;

the positive electrode substrate exposed portion is connected with a positive conductive member; and the negative electrode substrate exposed portion is connected with a negative conductive member.

12. The sealed battery according to claim 11, wherein a hollow portion exists at the center of the tin portion of the connecting member.

13. The sealed battery according to claim 11, wherein a cylindrical crimping member is used for the connecting member and is crimped.

14. A sealed battery, comprising:
an outer body having an opening portion,
an opening-sealing plate sealing the opening portion of the outer body,
an electrode assembly housed in the outer body, and
an external terminal electrically connected to the electrode assembly;
wherein a first insulator is arranged on one face of the opening-sealing plate, a second insulator is arranged on another face of the opening-sealing plate, a conductive member is arranged on a face of the first insulator being opposite to a side where the opening-sealing plate is positioned, each one of the opening-sealing plate, the first insulator, the second insulator and the conductive member has a through hole and the external terminal has a flange portion;
and wherein a connecting member passing through each of the through holes of the second insulator, the opening-sealing plate, the first insulator and the conductive member is provided on one side of the flange portion, a tip portion of the connecting member is crimped so that the opening-sealing plate and the conductive member are mechanically fixed and a tip portion of the crimped portion is welded to the conductive member with a high energy beam in such a way that a welded portion is formed, and the welded portion at the crimped portion is concaved from the other area of the crimped portion.

15. The sealed battery according to claim 14, wherein
the electrode assembly is a flat wound electrode assembly being made up of positive electrode and negative electrode wound with separators and is inserted into the outer body so that the winding axis direction of the electrode assembly is parallel to the opening-sealing plate;
the electrode assembly is provided with a positive electrode substrate exposed portion at one end portion thereof and the negative electrode substrate portion at the other end portion thereof;
the positive electrode substrate exposed portion is connected with a positive conductive member; and
the negative electrode substrate exposed portion is connected with a negative conductive member.

16. The sealed battery according to claim 15, wherein the tip portion of the crimped portion is welded to the conductive member at a plurality of points so as to form a plurality of the welded portions.

17. The seated battery according to claim 15, wherein a hollow portion exists at the center of the tin portion of the connecting member.

18. The sealed battery according to claim 15, wherein a cylindrical crimping member is used for the connecting member and is crimped.

19. The sealed battery according to claim 14, wherein the tip portion of the crimped portion is welded to the conductive member at a plurality of points so as to form a plurality of the welded portions.

\* \* \* \* \*